(12) United States Patent
Ma et al.

(10) Patent No.: US 12,250,080 B2
(45) Date of Patent: Mar. 11, 2025

(54) COMMUNICATION VIA SIDELINK RELAY

(71) Applicant: QUALCOMM Incorporated, San Diego, CA (US)

(72) Inventors: Ruifeng Ma, Beijing (CN); Yuwei Ren, Beijing (CN); Huilin Xu, Temecula, CA (US)

(73) Assignee: QUALCOMM Incorporated, San Diego, CA (US)

( * ) Notice: Subject to any disclaimer, the term of this patent is extended or adjusted under 35 U.S.C. 154(b) by 392 days.

(21) Appl. No.: 17/757,401

(22) PCT Filed: Dec. 23, 2020

(86) PCT No.: PCT/CN2020/138503
§ 371 (c)(1),
(2) Date: Jun. 15, 2022

(87) PCT Pub. No.: WO2021/136026
PCT Pub. Date: Jul. 8, 2021

(65) Prior Publication Data
US 2023/0034434 A1    Feb. 2, 2023

(30) Foreign Application Priority Data
Dec. 30, 2019  (WO) ................ PCT/CN2019/129748

(51) Int. Cl.
*H04L 1/1812*  (2023.01)
*H04L 1/08*  (2006.01)
*H04W 88/04*  (2009.01)

(52) U.S. Cl.
CPC .............. *H04L 1/1812* (2013.01); *H04L 1/08* (2013.01); *H04W 88/04* (2013.01)

(58) Field of Classification Search
CPC ......... H04L 1/1812; H04L 1/08; H04W 88/04
(Continued)

(56) References Cited

U.S. PATENT DOCUMENTS 11,716,309 B1 *  8/2023  Gawade ................. G06F 9/455
                                                            709/245
11,950,326 B2 *  4/2024  Selvanesan ........... H04L 1/1607
(Continued)

FOREIGN PATENT DOCUMENTS

| CN | 107431557 A | 12/2017 |
| CN | 108667569 A | 10/2018 |
| CN | 110290592 A | 9/2019 |

OTHER PUBLICATIONS

Intel Corporation: "Discussion on Conflict/Collision-Free Sidelink UE-to-NW Relaying for Wearable and IoT Use Cases", R1-1712517, 3GPP TSG RAN WG1 Meeting#90, Prague, Czech Republic, Aug. 21-25, 2017, Aug. 25, 2017 (Aug. 25, 2017) Section 2.2.2.1, Figure 2, pp. 1-5.

(Continued)

*Primary Examiner* — Anthony Mejia
(74) *Attorney, Agent, or Firm* — Harrity & Harrity, LLP \ Qualcomm

(57) ABSTRACT

Various aspects of the present disclosure generally relate to wireless communication. In some aspects, a user equipment (UE) may determine that one or more communications with a base station are to be transmitted or received via a relay UE. The one or more communications may include at least one of hybrid automatic repeat request feedback, a retransmission, or a control communication. The UE may transmit or receive the one or more communications via the relay UE. Numerous other aspects are provided.

35 Claims, 11 Drawing Sheets

(58) Field of Classification Search
USPC .......................................................... 370/329
See application file for complete search history.

(56) References Cited

U.S. PATENT DOCUMENTS

| | | | |
|---|---|---|---|
| 2009/0262678 A1 | 10/2009 | Oyman et al. | |
| 2016/0044613 A1 | 2/2016 | Cai et al. | |
| 2017/0353819 A1 | 12/2017 | Yin et al. | |
| 2018/0092085 A1* | 3/2018 | Shaheen | H04W 36/0094 |
| 2018/0146494 A1 | 5/2018 | Khoryaev et al. | |
| 2018/0206176 A1 | 7/2018 | Panteleev et al. | |
| 2019/0068334 A1* | 2/2019 | Stern-Berkowitz | H04L 1/1845 |
| 2019/0087244 A1* | 3/2019 | Turner | G06F 9/5077 |
| 2019/0090126 A1* | 3/2019 | Hayashi | H04W 74/02 |
| 2019/0215906 A1* | 7/2019 | Phuyal | H04L 1/1854 |
| 2020/0379812 A1* | 12/2020 | Ranjan | G06F 9/5077 |
| 2022/0004410 A1* | 1/2022 | Chen | G06F 9/45533 |
| 2022/0264533 A1* | 8/2022 | Zhang | H04L 1/1812 |
| 2024/0080277 A1* | 3/2024 | Lee | H04L 67/60 |
| 2024/0236034 A1* | 7/2024 | Kim | H04L 45/74 |

OTHER PUBLICATIONS

International Search Report and Written Opinion—PCT/CN2019/129748—ISA/EPO—Oct. 10, 2020.

International Search Report and Written Opinion—PCT/CN2020/138503—ISA/EPO—Mar. 22, 2021.

ITRI: "Discussion on Relay Associated Selection and Relay-Assisted eNB Resource Allocation for Sidelink UE-to-NW Relaying", R1-1714197, 3GPP TSG RAN WG1 Meeting #90, Prague, Czechia, Aug. 21-25, 2017, Aug. 25, 2017 (Aug. 25, 2017) the Whole Document, 5 Pages.

SONY: "Discussion on Sidelink UE-to-NW Relaying", R1-1712981, 3GPP TSG RAN WG1 Meeting #90, Prague, Czechia, Aug. 21-25, 2017, Aug. 25, 2017 (Aug. 25, 2017) the Whole Document, 4 Pages.

ZTE: "Sidelink Feedback of FeD2D Relay", 3GPP TSG RAN WG1 Meeting #90, Prague, Czech Republic, Aug. 21-25, 2017, R1-1712921, Aug. 25, 2017 (Aug. 25, 2017) Section 2, Figure 3, 6 Pages.

Supplementary European Search Report—EP20908764—Search Authority—The Hague—2023.

* cited by examiner

900 ⟶

910 — Determine that one or more communications with a user equipment (UE) are to be transmitted or received via a relay UE, where the one or more communications include at least one of hybrid automatic repeat request (HARQ) feedback, a retransmission, or a control communication 920 — Transmit or receive the one or more communications via the relay UE

FIG. 9

COMMUNICATION VIA SIDELINK RELAY

CROSS-REFERENCE TO RELATED APPLICATIONS

This Patent Application is a 371 national stage of PCT Application No. PCT/CN2020/138503 filed on Dec. 23, 2020, entitled "COMMUNICATION VIA SIDELINK RELAY," which claims priority to Patent Cooperation Treaty (PCT) Application No. PCT/CN2019/129748, filed on Dec. 30, 2019, entitled "COMMUNICATION VIA SIDELINK RELAY," both of which are hereby expressly incorporated by reference herein.

FIELD OF THE DISCLOSURE

Aspects of the present disclosure generally relate to wireless communication and to techniques and apparatuses for communication via sidelink relay.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include determining that one or more communications with a base station are to be transmitted or received via a relay UE, wherein the one or more communications include at least one of hybrid automatic repeat request (HARQ) feedback, a retransmission, or a control communication; and transmitting or receiving the one or more communications via the relay UE.

In some aspects, a method of wireless communication, performed by a relay UE, may include determining that one or more communications between a base station and a UE are to be transmitted or received via the relay UE, wherein the one or more communications include at least one of HARQ feedback, a retransmission, or a control communication; and relaying the one or more communications between the base station and the UE.

In some aspects, a method of wireless communication, performed by a base station, may include determining that one or more communications with a UE are to be transmitted or received via a relay UE, wherein the one or more communications include at least one of HARQ feedback, a retransmission, or a control communication; and transmitting or receiving the one or more communications via the relay UE.

In some aspects, a UE for wireless communication may include memory and one or more processors coupled to the memory. The memory and the one or more processors may be configured to determine that one or more communications with a base station are to be transmitted or received via a relay UE, wherein the one or more communications include at least one of HARQ feedback, a retransmission, or a control communication; and transmit or receive the one or more communications via the relay UE.

In some aspects, a relay UE for wireless communication may include memory and one or more processors coupled to the memory. The memory and the one or more processors may be configured to determine that one or more communications between a base station and a UE are to be transmitted or received via the relay UE, wherein the one or more communications include at least one of HARQ feedback, a retransmission, or a control communication; and relay the one or more communications between the base station and the UE.

In some aspects, a base station for wireless communication may include memory and one or more processors coupled to the memory. The memory and the one or more processors may be configured to determine that one or more communications with a UE are to be transmitted or received via a relay UE, wherein the one or more communications include at least one of HARQ feedback, a retransmission, or a control communication; and transmit or receive the one or more communications via the relay UE.

In some aspects, a non-transitory computer-readable medium may store one or more instructions for wireless communication. The one or more instructions, when executed by one or more processors of a UE, may cause the one or more processors to: determine that one or more communications with a base station are to be transmitted or received via a relay UE, wherein the one or more communications include at least one of HARQ feedback, a retransmission, or a control communication; and transmit or receive the one or more communications via the relay UE.

In some aspects, a non-transitory computer-readable medium may store one or more instructions for wireless communication. The one or more instructions, when executed by one or more processors of a relay UE, may cause the one or more processors to: determine that one or more communications between a base station and a UE are to be transmitted or received via the relay UE, wherein the one or more communications include at least one of HARQ feedback, a retransmission, or a control communication; and relay the one or more communications between the base station and the UE.

In some aspects, a non-transitory computer-readable medium may store one or more instructions for wireless communication. The one or more instructions, when executed by one or more processors of a base station, may cause the one or more processors to: determine that one or more communications with a UE are to be transmitted or received via a relay UE, wherein the one or more communications include at least one of HARQ feedback, a retransmission, or a control communication; and transmit or receive the one or more communications via the relay UE.

In some aspects, an apparatus for wireless communication may include means for determining that one or more communications with a base station are to be transmitted or received via a relay UE, wherein the one or more communications include at least one of HARQ feedback, a retransmission, or a control communication; and means for transmitting or receiving the one or more communications via the relay UE.

In some aspects, an apparatus for wireless communication may include means for determining that one or more communications between a base station and a UE are to be transmitted or received via the apparatus, wherein the one or more communications include at least one of HARQ feedback, a retransmission, or a control communication; and means for relaying the one or more communications between the base station and the UE.

In some aspects, an apparatus for wireless communication may include means for determining that one or more communications with a UE are to be transmitted or received via a relay UE, wherein the one or more communications include at least one of HARQ feedback, a retransmission, or a control communication; and means for transmitting or receiving the one or more communications via the relay UE.

Aspects generally include a method, apparatus, system, computer program product, non-transitory computer-readable medium, user equipment, base station, wireless communication device, and/or processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 9 is a diagram illustrating an example process performed, for example, by a base station, in accordance with various aspects of the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
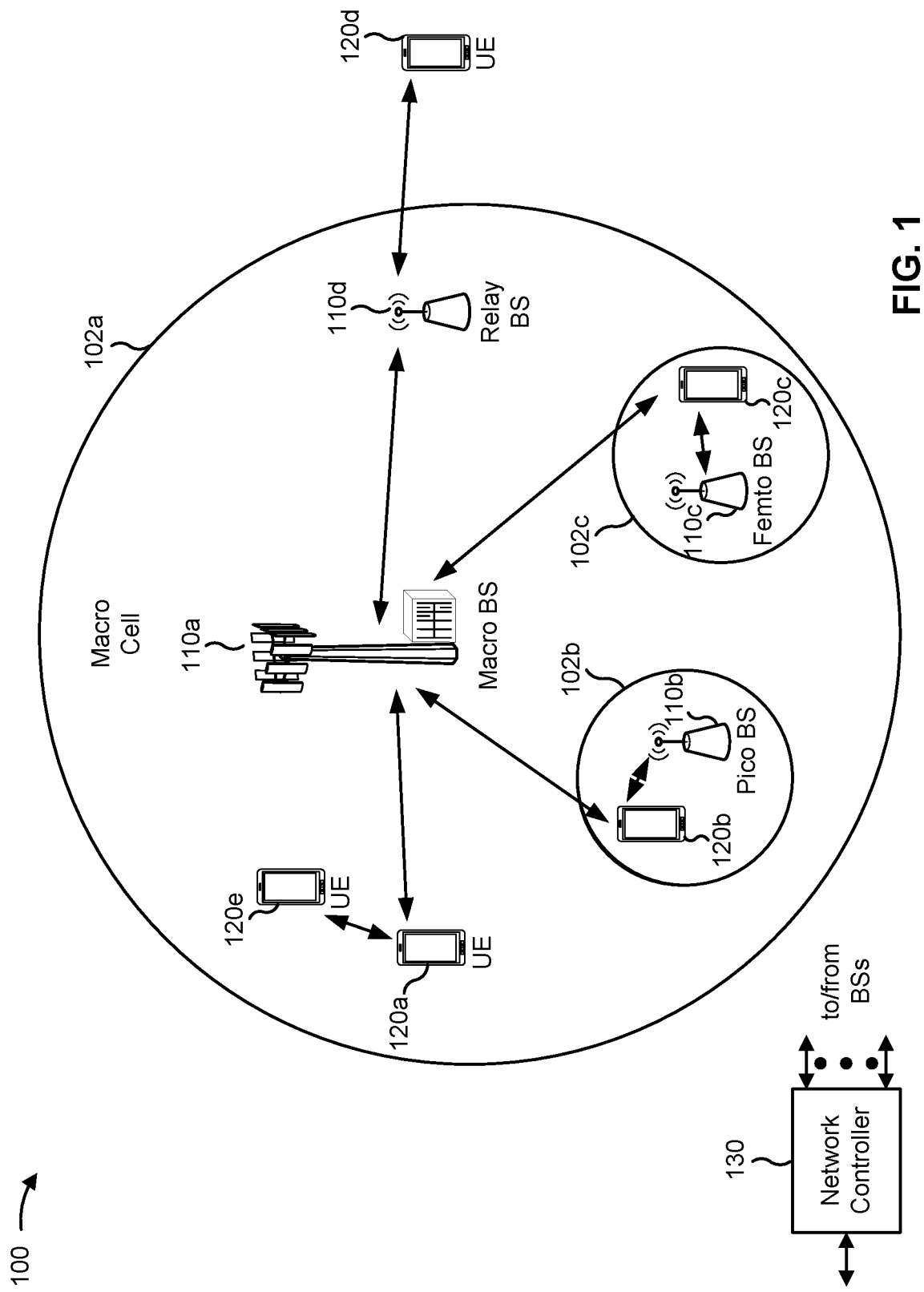
FIG. 1 is a diagram illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
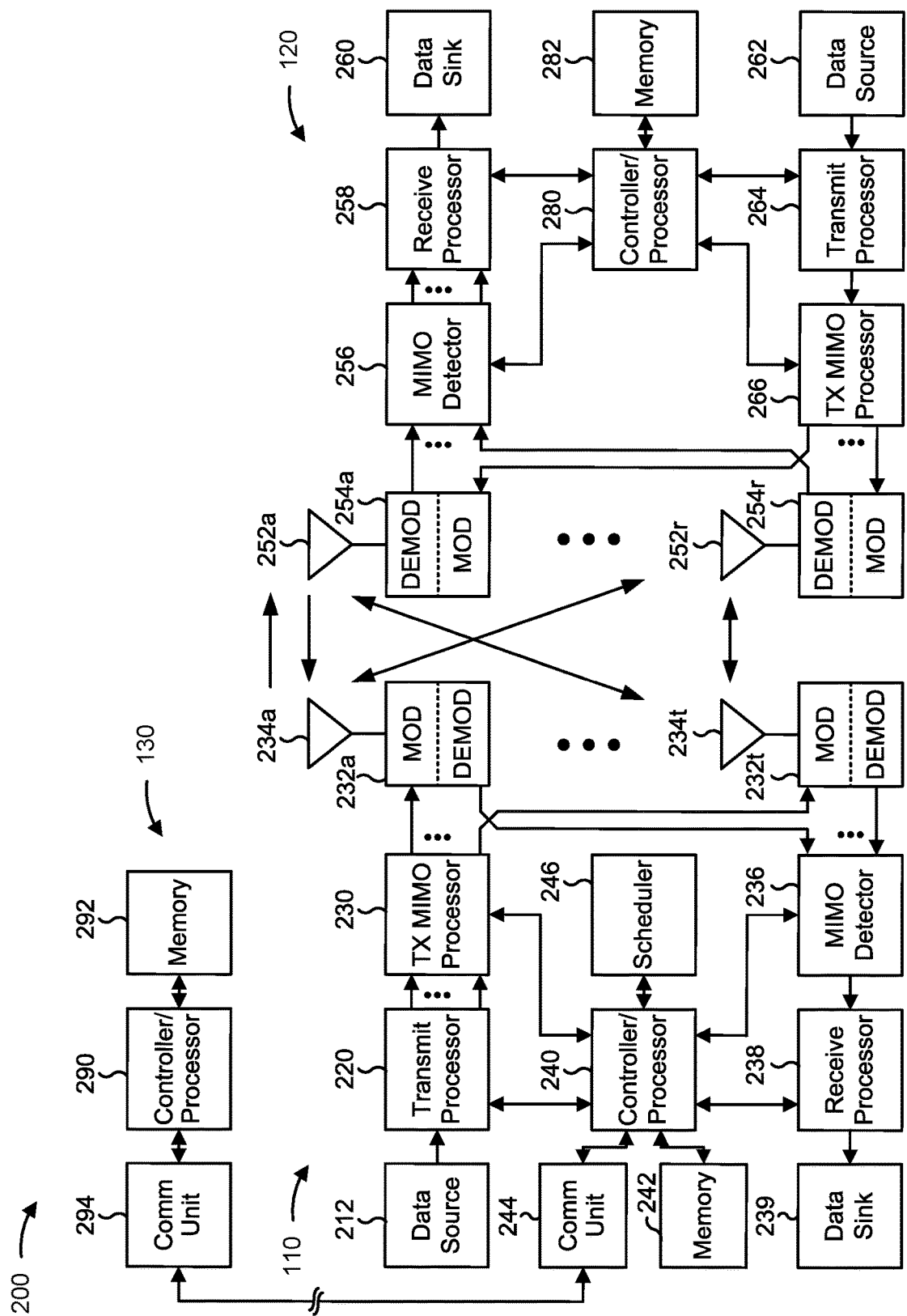
FIG. 2 is a diagram illustrating an example of a base station in communication with a UE in a wireless communication network, in accordance with various aspects of the present disclosure.

FIG. 2 shows a diagram of a design 200 of base station 110 and UE 120, which may be one of the base stations and one of the UEs in FIG. 1. Base station 110 may be equipped with T antennas 234*a* through 234*t*, and UE 120 may be equipped with R antennas 252*a* through 252*r*, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232*a* through 232*t*. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232*a* through 232*t* may be transmitted via T antennas 234*a* through 234*t*, respectively. According to various aspects described in more detail below, the synchronization signals can be generated with location encoding to convey additional information.

At UE 120, antennas 252*a* through 252*r* may receive the downlink signals from base station 110 and/or other base stations and may provide received signals to demodulators (DEMODs) 254*a* through 254*r*, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254*a* through 254*r*, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254*a* through 254*r* (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with communication via sidelink relay, as described in more detail elsewhere herein. For example, controller/processor 240 of base station 110, controller/processor 280 of UE 120, and/or any other component(s) of FIG. 2 may perform or direct operations of, for example, process 700 of FIG. 7, process 800 of FIG. 8, process 900 of FIG. 9, and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed by one or more processors of the base station 110 and/or the UE 120, may perform or direct operations of, for example, process 700 of FIG. 7, process 800 of FIG. 8, process 900 of FIG. 9, and/or other processes as described herein. A scheduler 246 may schedule UEs for data transmission on the downlink and/or uplink.

In some aspects, UE 120 may include means for determining that one or more communications with a base station are to be transmitted or received via a relay UE, where the one or more communications include at least one of hybrid automatic repeat request (HARQ) feedback, a retransmission, or a control communication, means for transmitting or receiving the one or more communications via the relay UE, means for determining that one or more communications between a base station and a UE are to be transmitted or received via the UE 120, where the one or more communications include at least one of HARQ feedback, a retransmission, or a control communication, means for relaying the one or more communications between the base station and the UE, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for determining that one or more communications with a UE are to be transmitted or received via a relay UE, where the one or more communications include at least one of HARQ feedback, a retransmission, or a control communication, means for transmitting or receiving the one or more communications via the relay UE, and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

As indicated above, FIG. 2 is provided as an example. Other examples may differ from what is described with regard to FIG. 2.

Figure 3:
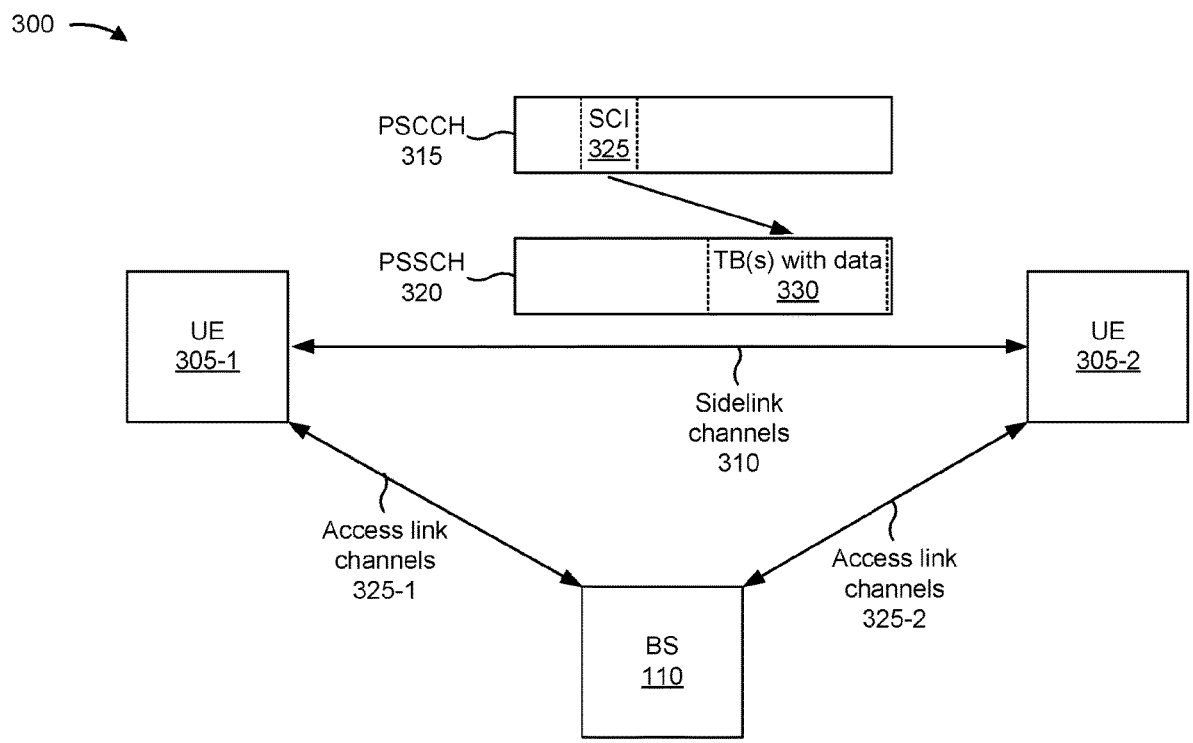
FIG. 3 is a diagram an example of communications via a sidelink, in accordance with various aspects of the present disclosure.

FIG. 3 is a diagram illustrating an example 300 of communications via a sidelink, in accordance with certain aspects of the present disclosure.

As shown in FIG. 3, a first UE 305-1 may communicate with a second UE 305-2 (and one or more other UEs 305) using device-to-device (D2D) communications via one or more sidelink channels 310. In some aspects, the UEs 305 may correspond to one or more other UEs described elsewhere herein, such as UE 120 and/or the like. In some aspects, the sidelink channel 310 may use a PC5 interface and/or may operate in a high frequency band (e.g., the 5.9 GHz band). Additionally, or alternatively, the UEs 305 may synchronize timing of transmission time intervals (e.g., frames, subframes, slots, and/or the like) using global navigation satellite system (GNSS) timing. The UEs 305 may transmit communications (e.g., one-to-many broadcasts and/or multicast transmissions) using the sidelink channel 310.

As further shown in FIG. 3, the sidelink channel 310 may include a physical sidelink control channel (PSCCH) 315 and a physical sidelink shared channel (PSSCH) 320. The PSCCH 315 may be used to communicate control information, similar to a physical downlink control channel (PDCCH) and/or a physical uplink control channel (PUCCH) used for communications with a base station 110. The PSSCH 320 may be used to communicate data, similar to a physical downlink shared channel (PDSCH) and/or a physical uplink shared channel (PUSCH) used for communications with a base station 110. For example, the PSCCH 315 may carry sidelink control information (SCI) 325, which may indicate various control information used for sidelink communications, such as one or more resources (e.g., time and/or frequency resources) where a transport block (TB) 330 that includes data is carried on the PSSCH 320. In some cases, the TB 330 may include vehicle-to-everything (V2X) data, such as a basic safety message (BSM), a traffic information message (TIM), a signal phase and time (SPAT) message, a MAP message to convey geographic road information, a cooperative awareness message (CAM), a distributed environment notification message (DENM), an in-vehicle information (IVI) message, and/or the like.

In some aspects, the sidelink channel 310 may use resource pools. For example, a scheduling assignment (e.g., included in SCI 325) may be transmitted in sub-channels using specific resource blocks (RBs) across time. In some aspects, data transmissions (e.g., on the PSSCH 320) associated with a scheduling assignment may occupy adjacent RBs in the same subframe as the scheduling assignment (e.g., using frequency division multiplexing). In some aspects, a scheduling assignment and associated data transmissions are not transmitted on adjacent RBs.

In some aspects, a UE 305 may operate using transmission mode 3, where resource selection and/or scheduling is performed by a base station 110. In some aspects, a UE 305 may operate using transmission mode 4, where resource selection and/or scheduling is performed by the UE 305 (e.g., rather than a base station 110). In some aspects, the UE 305 may perform resource selection and/or scheduling by sensing channel availability for transmissions. For example, the UE 305 may measure a received signal strength indicator (RSSI) parameter (e.g., a sidelink-RSSI (S-RSSI) parameter) associated with various sidelink channels, may measure a reference signal received power (RSRP) parameter (e.g., a PSSCH-RSRP parameter) associated with various sidelink channels, may measure a reference signal received quality (RSRQ) parameter (e.g., a PSSCH-RSRQ parameter) associated with various sidelink channels, and/or the like, and may select a channel for transmission of communications based at least in part on the measurement(s).

Additionally, or alternatively, the UE 305 may perform resource selection and/or scheduling using SCI 325 received in the PSCCH 315, which may indicate occupied resources, channel parameters, and/or the like. Additionally, or alternatively, the UE 305 may perform resource selection and/or scheduling by determining a channel busy rate (CBR) associated with various sidelink channels, which may be used for rate control (e.g., by indicating a maximum number of resource blocks that the UE 305 can use for a particular set of subframes).

In transmission mode 4, a UE 305 may generate sidelink grants, and may transmit the grants in SCI 325. A sidelink grant may indicate, for example, one or more parameters (e.g., transmission parameters) to be used for an upcoming transmission, such as one or more resource blocks to be used for the upcoming transmission on the PSSCH 320 (e.g., for TBs 330), one or more subframes to be used for the upcoming transmission, a modulation and coding scheme (MCS) to be used for the upcoming transmission, and/or the like. In some aspects, a UE 305 may generate a sidelink grant that indicates one or more parameters for semi-persistent scheduling (SPS), such as a periodicity of a transmission (e.g., a periodic V2X message, such as a safety message and/or the like). Additionally, or alternatively, the UE 305 may generate a sidelink grant for event-driven scheduling, such as for an on-demand message.

A UE 305 in coverage of a base station 110 may perform sidelink communication using a configuration and control information provided dynamically by the base station 110, and according to one or more configured parameters. A UE 305 that is out of coverage of a base station 110 may autonomously perform sidelink communication according to configured parameters. A UE 305 that is out of coverage may receive system information from another UE 305 that is in coverage.

In some wireless communication systems, the first UE 305-1 may have dual connectivity with a base station 110 on an access link 325-1 and with the second UE 305-2 on a sidelink 310. However, in some cases, the access link 325-1 may have a poor channel quality, for example, when the first UE 305-1 is located near a cell edge, when the first UE 305-1 is associated with a low tier, and/or the like. As a result of the poor channel quality, communication between the first UE 305-1 and the BS 110 may include multiple HARQ feedback transmissions and/or multiple retransmissions, thereby causing delays, consuming additional network and UE resources, and/or the like. For example, if a downlink transmission from the BS 110 fails at the first UE 305-1, the UE may signal negative acknowledgment feedback to the BS 110. The BS 110 may retransmit the failed communication using a different redundancy version. Here, each redundancy version used for a transmission may correspond to a different set of parity bits of the same encoded block (e.g., the variation between the different sets of bits is controlled by the redundancy version that is used). The first UE 305-1 may continue to negatively acknowledgment retransmissions, and the BS 110 may perform further retransmissions until the communication is successful or a retransmission limit is reached.

Some techniques and apparatuses described herein utilize the sidelink with the second UE 305-2 (e.g., a relay UE) for relaying communications, such as HARQ feedback and/or retransmissions, between the first UE 305-1 (e.g., a target UE) and the BS 110. For example, the second UE 305-2 may receive downlink communications from the BS 110 on an access link 325-2, and relay the downlink communications to the first UE 305-1 on the sidelink 310. Similarly, the second UE 305-2 may receive uplink communications from the first UE 305-1, and relay the uplink communications to the BS 110 on the access link 325-2. In this way, performance of the communications is improved, which may reduce delays, reduce HARQ feedback transmissions and retransmissions, conserve network and UE resources, and/or the like.

As indicated above, FIG. 3 is provided as an example. Other examples may differ from what is described with respect to FIG. 3.

Figure 4:
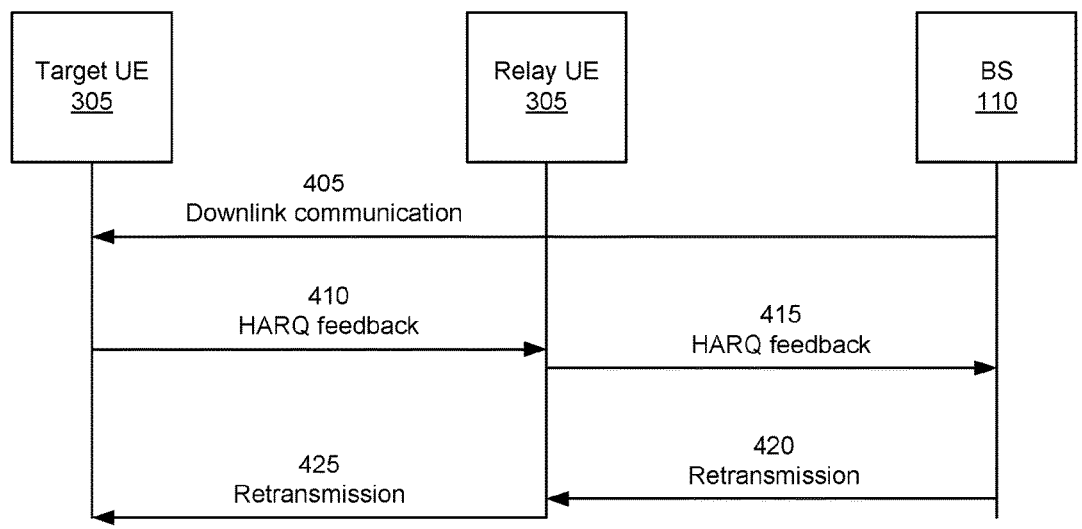
FIGS. 4-6 are diagrams illustrating examples of communication via sidelink relay, in accordance with various aspects of the present disclosure.
Figure 5:
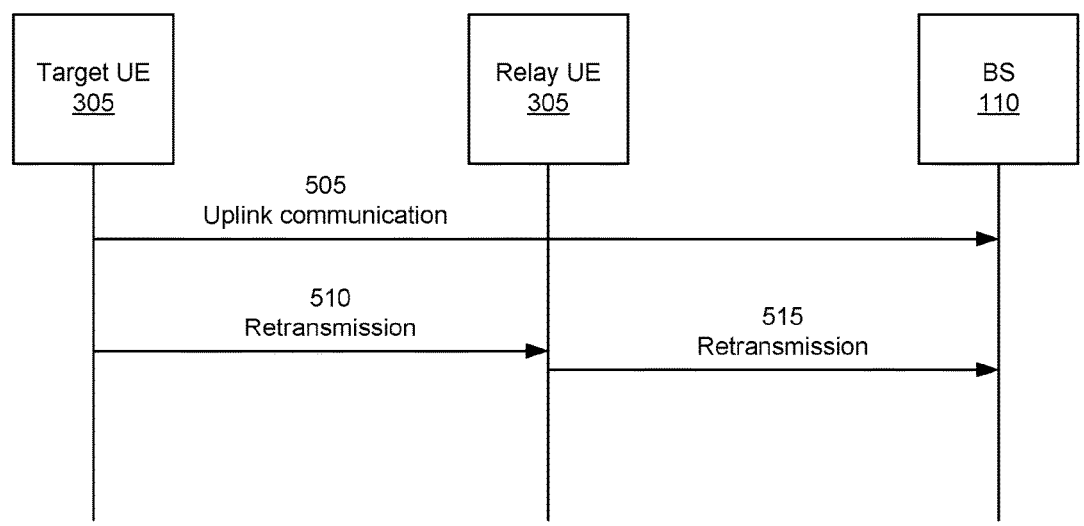
Figure 6:
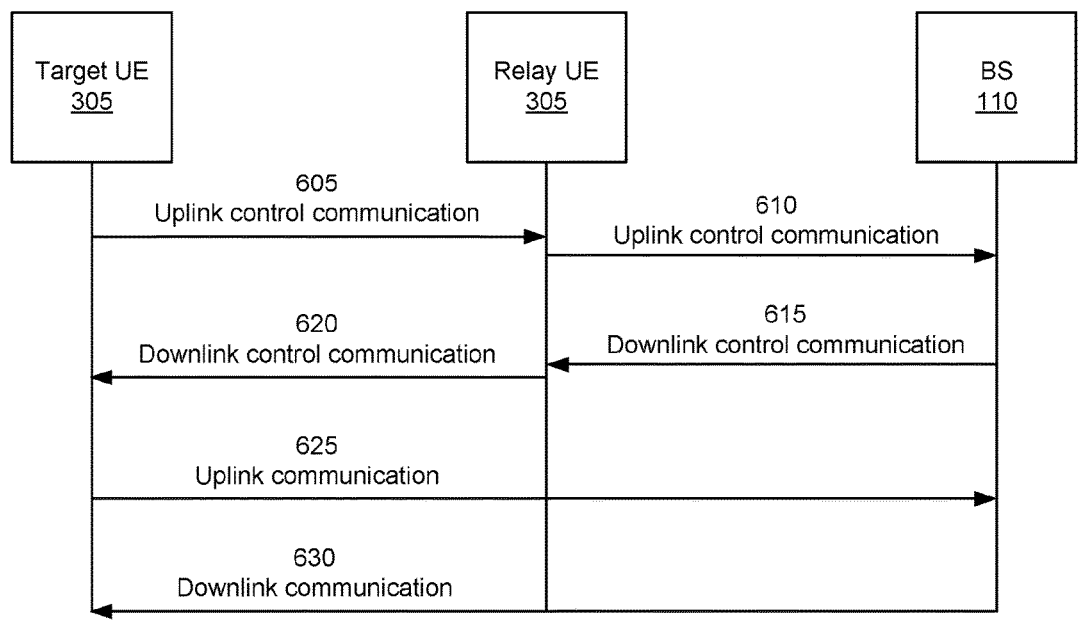

FIGS. 4-6 are diagrams illustrating examples 400, 500, and 600, respectively, of communication via sidelink relay, in accordance with various aspects of the present disclosure. As shown in FIGS. 4-6, a target UE 305 (e.g., one of the first UE 305-1 or the second UE 305-2) may communicate with a relay UE 305 (e.g., the other of the first UE 305-1 or the second UE 305-2) and a BS 110. For example, the target UE 305 may have a dual connectivity to the relay UE 305 and the BS 110, and the relay UE 305 may have a dual connectivity to the target UE 305 and the BS 110. In some aspects, the target UE 305 may communicate with the relay UE 305 on a sidelink (e.g., sidelink 310), the target UE 305 may communicate with the BS 110 on a first access link (e.g., access link 325-1), such as over a Uu interface, and the relay UE 305 may communicate with the BS 110 on a second access link (e.g., access link 325-2), such as over a second Uu interface.

In such cases, the target UE 305 and the BS 110 may use the relay UE 305 as a relay for communications between the target UE 305 and the BS 110. In some aspects, the target UE 305 and the BS 110 may use the relay UE 305 as the relay when the target UE 305 is within a coverage of the relay UE 305. For example, the target UE 305, the relay UE 305, and/or the BS 110 may determine that the relay UE 305 is to be used as the relay in connection with a determination that the target UE 305 is within the coverage of the relay UE 305.

In some aspects, the target UE 305 and/or the relay UE 305 may transmit an indication to the BS 110 that the relay UE 305 is to be used as the relay. In some aspects, the target UE 305 and/or the relay UE 305 may receive an indication from the BS 110 that the relay UE 305 is to be used as the relay. An indication may be transmitted or received via radio resource control (RRC) signaling, a medium access control control element (MAC-CE), or downlink control information (DCI). In some aspects, an indication may be based at least in part on whether the target UE 305 is a low-tier UE and the relay UE 305 is a high-tier UE. A high-tier UE may refer to a UE that is associated with a receive bandwidth capability in receiving downlink signals/channels that is above a particular threshold (e.g., a bandwidth of greater than or equal to 100 megahertz (MHz)). In contrast, a low-tier UE (e.g., an NR-light UE, a low-capability UE, and/or the like) may refer to a UE with a bandwidth capability in receiving the downlink signals/channels that is below a particular threshold (e.g., a bandwidth of less than 10 MHz, less than 5 MHz, and/or the like). Low-tier UEs may include wearable devices, Internet of Things (IoT) devices, sensors, cameras, and/or the like that are associated with a limited bandwidth, power capacity, transmission range, and/or the like.

In some aspects, an indication may be based at least in part on whether the target UE 305 is associated with a lower capability than the relay UE 305. For example, the target UE 305 may have a lower processing capability than the relay UE 305. In some aspects, an indication may be based at least in part on whether the first access link of the target UE 305 with the BS 110 has a lesser quality than the second access link of the relay UE 305 with the BS 110 (e.g., in connection with reference signal received quality (RSRQ) measurements, and/or the like, on the first access link and the second access link). In some aspects, an indication may be based at least in part on whether the target UE 305 is located further from the BS 110 than the relay UE 305.

In some aspects, an indication may be based at least in part on a capability report transmitted by the target UE 305 and/or the relay UE 305. In some aspects, the target UE 305 may transmit, to the BS 110 and/or the relay UE 305, a capability report that indicates whether the target UE 305 supports using a relay UE for one or more of relaying an initial transmission, relaying HARQ feedback, relaying a retransmission, relaying a data channel communication, or relaying a control channel communication. In some aspects, the relay UE 305 may transmit, to the BS 110 and/or the target UE 305, a capability report that indicates whether the relay UE 305 supports one or more of relaying an initial transmission, relaying HARQ feedback, relaying a retransmission, relaying a data channel communication, or relaying a control channel communication.

In some aspects, the target UE 305 may determine (e.g., based at least in part on receiving or transmitting an indication) that one or more communications with the BS 110 are to be transmitted or received via the relay UE 305, and accordingly, may transmit or receive the one or more communications via the relay UE 305. In some aspects, the relay UE 305 may determine (e.g., based at least in part on receiving or transmitting an indication) that one or more communications between the BS 110 and the target UE 305 are to be transmitted or received via the relay UE 305, and accordingly, may relay the one or more communications between the BS 110 and the target UE 305. In some aspects, the BS 110 may determine (e.g., based at least in part on receiving or transmitting an indication) that one or more communications with the target UE 305 are to be transmitted or received via the relay UE 305, and accordingly, may transmit or receive the one or more communications via the relay UE 305.

As shown in FIG. 4, the target UE 305 and the BS 110 may communicate HARQ feedback and/or downlink retransmissions via the relay UE 305. As shown by reference number 405, the BS 110 may transmit, and the target UE 305 may receive, a downlink communication. For example, the target UE 305 may receive the downlink communication on the first access link with the BS 110. In some aspects, the downlink communication may be a downlink shared channel (DL-SCH) communication or a downlink control channel (DL-CCH) communication. In some aspects, the downlink communication is an initial transmission that is a first redundancy version (RV) of the downlink communication (e.g., RV 0).

In some aspects, the BS 110 may transmit the downlink communication (e.g., RV 0) to the relay UE 305 instead of to the target UE 305. In such a case, the BS 110 may transmit the downlink communication on the second access link with the relay UE 305. The relay UE 305 may transmit the received downlink communication to the target UE 305 on the sidelink with the target UE 305.

As shown by reference number 410, the target UE 305 may transmit, and the relay UE 305 may receive, HARQ feedback for the downlink communication. For example, the target UE 305 may transmit the HARQ feedback on the sidelink with the relay UE 305. The HARQ feedback may be an acknowledgment (ACK) or a negative ACK (NACK) for the downlink communication.

As shown by reference number 415, the relay UE 305 may transmit, and the BS 110 may receive, the HARQ feedback received from the target UE 305. For example, the relay UE 305 may transmit the HARQ feedback on the second access link with the BS 110. In this way, the relay UE 305 may relay the HARQ feedback, which originated at the target UE 305, to the BS 110.

As shown by reference number 420, the BS 110 may transmit, and the relay UE 305 may receive, a retransmission of the downlink communication. For example, the BS 110 may transmit the retransmission of the downlink communication on the second access link with the relay UE 305. In some aspects, the BS 110 may transmit the retransmission to the target UE 305 (e.g., on the first access link) instead of to the relay UE 305. The BS 110 may transmit the retransmission of the downlink communication in connection with receiving a NACK for the downlink communication. In some aspects, the retransmission may be a second RV of the downlink communication (e.g., RV 2, RV 3, and/or the like) that is different from the first RV of the downlink communication (e.g., that is associated with the initial transmission).

In some aspects, the relay UE 305 may forward the retransmission without decoding the retransmission. Alternatively, the relay UE 305 may decode the retransmission upon receiving the retransmission from the BS 110, and re-encode (e.g., regenerate) the retransmission for relaying to the target UE 305. In some aspects, the relay UE 305 may decode the retransmission based at least in part on an initial transmission (e.g., RV 0) or based at least in part on a previous transmission (e.g., a previous RV) that was decoded by the target UE 305. In some aspects, whether the relay UE 305 is to forward the retransmission without decoding, or is to decode and re-encode the retransmission, may be according to a configuration or a capability of the relay UE 305.

As shown by reference number 425, the relay UE 305 may transmit, and the target UE 305 may receive, the retransmission (e.g., the forwarded retransmission or the re-encoded retransmission). For example, the relay UE 305 may transmit the retransmission on the sidelink with the target UE 305. In this way, the relay UE 305 may relay the retransmission, which originated at the BS 110, to the target UE 305.

The target UE 305 may transmit additional HARQ feedback (e.g., to the retransmission) and/or the BS 110 may transmit additional retransmissions (e.g., in connection with receiving additional NACK feedback), in a manner similar to that described above.

As shown in FIG. 5, the target UE 305 and the BS 110 may communicate uplink retransmissions and/or downlink control communications scheduling the uplink retransmissions via the relay UE 305. As shown by reference number 505, the target UE 305 may transmit, and the BS 110 may receive, an uplink communication. For example, the target UE 305 may transmit the uplink communication on the first access link with the BS 110. In some aspects, the uplink communication may be an uplink shared channel (UL-SCH) communication or an uplink control channel (UL-CCH) communication. In some aspects, the uplink communication is an initial transmission that is a first RV of the uplink communication (e.g., RV 0).

In some aspects, the target UE 305 may transmit the uplink communication (e.g., RV 0) to the relay UE 305 instead of to the BS 110. In such a case, the target UE 305 may transmit the uplink communication on the sidelink with the relay UE 305. The relay UE 305 may transmit the received uplink communication to the BS 110 on the second access link with the BS 110.

As shown by reference number 510, the target UE 305 may transmit, and the relay UE 305 may receive, a retransmission of the uplink communication. For example, the target UE 305 may transmit the retransmission of the uplink communication on the sidelink with the relay UE 305. In some aspects, the target UE 305 may transmit the retransmission of the uplink communication in connection with receiving a DL-CCH communication (e.g., that includes DCI) that schedules the retransmission. In some aspects, the BS 110 may transmit, and the target UE 305 may receive, the DL-CCH on the first access link. In some aspects, the BS 110 may transmit, and the relay UE 305 may receive, the DL-CCH on the second access link, and the relay UE 305 may relay the DL-CCH to the target UE 305 on the sidelink. In some aspects, the retransmission may be a second RV of the uplink communication (e.g., RV 2, RV 3, and/or the like) that is different from the first RV of the uplink communication (e.g., that is associated with the initial transmission).

In some aspects, the relay UE 305 may forward the retransmission without decoding the retransmission. Alternatively, the relay UE 305 may decode the retransmission upon receiving the retransmission from the target UE 305, and re-encode (e.g., regenerate) the retransmission for relaying to the BS 110, in a manner similar to that described above.

As shown by reference number 515, the relay UE 305 may transmit, and the BS 110 may receive, the retransmission (e.g., the forwarded retransmission or the re-encoded retransmission). For example, the relay UE 305 may transmit the retransmission on the second access link with the BS 110. In this way, the relay UE 305 may relay the retransmission, which originated at the target UE 305, to the BS 110.

The BS 110 may transmit additional downlink control communications (e.g., including DCI that schedules a retransmission) and/or the target UE 305 may transmit additional retransmissions (e.g., in connection with receiving additional downlink control communications), in a manner similar to that described above.

As shown in FIG. 6, the target UE 305 and the BS 110 may communicate control communications via the relay UE 305. As shown by reference number 605, the target UE 305 may transmit, and the relay UE 305 may receive, an uplink control communication (e.g., a UL-CCH communication) for the BS 110. For example, the target UE 305 may transmit the uplink control communication on the sidelink with the relay UE 305. The uplink control communication may include a scheduling request for an uplink data communication of the target UE 305.

As shown by reference number 610, the relay UE 305 may transmit, and the BS 110 may receive, the uplink control communication received from the target UE 305. For example, the relay UE 305 may transmit the uplink control communication on the second access link with the BS 110. In this way, the relay UE 305 may relay the uplink control communication, which originated at the target UE 305, to the BS 110.

As shown by reference number 615, the BS 110 may transmit, and the relay UE 305 may receive, a downlink control communication (e.g., a DL-CCH communication). For example, the BS 110 may transmit the downlink control communication on the second access link with the relay UE 305. The downlink control communication may include DCI that schedules a communication for the target UE 305. In some aspects, the DCI may schedule an uplink communication for the target UE 305. For example, the BS 110 may transmit the downlink control communication in connection with receiving the uplink control communication (e.g., that includes a scheduling request) that originated at the target UE 305. In some aspects, the DCI may schedule a downlink communication for the target UE 305.

As shown by reference number 620, the relay UE 305 may transmit, and the target UE 305 may receive, the downlink control communication received from the BS 110. For example, the relay UE 305 may transmit the downlink control communication on the sidelink with the target UE 305. In this way, the relay UE 305 may relay the downlink control communication, which originated at the BS 110, to the target UE 305.

As shown by reference number 625, the target UE 305 may transmit, and the BS 110 may receive, an uplink communication (e.g., a UL-SCH communication). For example, the target UE 305 may transmit the uplink communication on the first access link with the BS 110. The target UE 305 may transmit the uplink communication in accordance with DCI of the downlink control communication (e.g., that was received via the relay UE 305). Accordingly, the target UE 305 may transmit the uplink communication in connection with transmitting the uplink control communication (e.g., to the relay UE 305).

As shown by reference number 630, the BS 110 may transmit, and the target UE 305 may receive, a downlink communication (e.g., a DL-SCH communication). For example, the target UE 305 may receive the downlink communication on the first access link with the BS 110. The target UE 305 may receive the uplink communication in accordance with DCI of the downlink control communication (e.g., that was received via the relay UE 305).

The BS 110 may transmit additional downlink control communications (e.g., scheduling a downlink communication or an uplink communication) and/or the target UE 305 may transmit additional uplink control communications (e.g., including a scheduling request), in a manner similar to that described above.

As indicated above, FIGS. 4-6 are provided as examples. Other examples may differ from what is described with respect to FIGS. 4-6.

Figure 7:
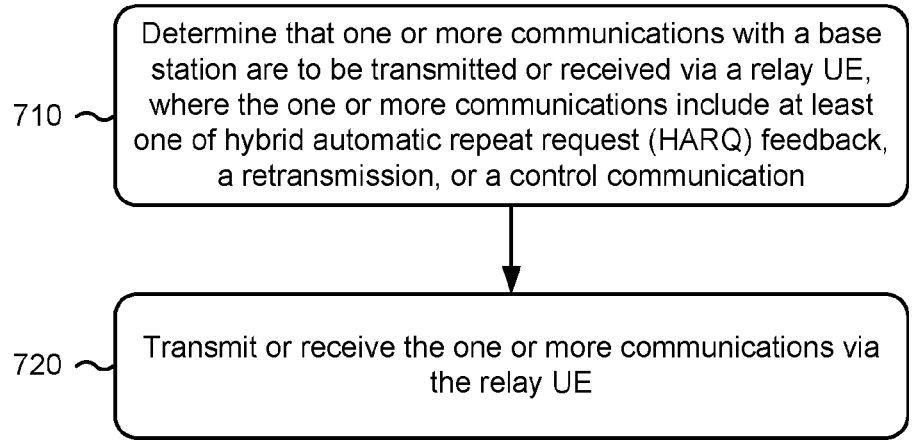
FIG. 7 is a diagram illustrating an example process performed, for example, by a UE, in accordance with various aspects of the present disclosure.

FIG. 7 is a diagram illustrating an example process 700 performed, for example, by a UE, in accordance with various aspects of the present disclosure. Example process 700 is an example where the UE (e.g., UE 120, UE 305, and/or the like) performs operations associated with communication via sidelink relay.

As shown in FIG. 7, in some aspects, process 700 may include determining that one or more communications with a base station are to be transmitted or received via a relay UE, wherein the one or more communications include at least one of HARQ feedback, a retransmission, or a control communication (block 710). For example, the UE (e.g., using controller/processor 280 and/or the like) may determine that one or more communications with a base station are to be transmitted or received via a relay UE, as described above. In some aspects, the one or more communications include at least one of HARQ feedback, a retransmission, or a control communication.

As further shown in FIG. 7, in some aspects, process 700 may include transmitting or receiving the one or more communications via the relay UE (block 720). For example, the UE (e.g., using controller/processor 280, transmit processor 264, TX MIMO processor 266, MOD 254, antenna 252, DEMOD 254, MIMO detector 256, receive processor 258, and/or the like) may transmit or receive the one or more communications via the relay UE, as described above.

Process 700 may include additional aspects, such as any single aspect or any combination of aspects described below and/or in connection with one or more other processes described elsewhere herein.

In a first aspect, transmitting or receiving the one or more communications may include receiving a downlink communication on an access link with the base station or on a sidelink with the relay UE, and transmitting HARQ feedback, for the downlink communication, on the sidelink with the relay UE. In a second aspect, alone or in combination with the first aspect, transmitting or receiving the one or more communications may include receiving a retransmission of the downlink communication on the access link with the base station or on the sidelink with the relay UE. In a third aspect, alone or in combination with one or more of the first and second aspects, the retransmission is received on the sidelink with the relay UE, and the retransmission has been decoded and re-encoded by the relay UE.

In a fourth aspect, alone or in combination with one or more of the first through third aspects, transmitting or receiving the one or more communications may include transmitting an uplink communication on an access link with the base station or on a sidelink with the relay UE, and transmitting a retransmission of the uplink communication on the sidelink with the relay UE. In a fifth aspect, alone or in combination with one or more of the first through fourth aspects, transmitting or receiving the one or more communications may include receiving a downlink control channel communication, that schedules the retransmission, on the access link with the base station or on the sidelink with the relay UE.

In a sixth aspect, alone or in combination with one or more of the first through fifth aspects, transmitting or receiving the one or more communications may include receiving a downlink control channel communication on a sidelink with the relay UE, and receiving a downlink shared channel communication on an access link with the base station. In a seventh aspect, alone or in combination with one or more of the first through sixth aspects, transmitting or receiving the one or more communications may include transmitting an uplink control channel communication on a sidelink with the relay UE, and transmitting an uplink shared channel communication on an access link with the base station.

In an eighth aspect, alone or in combination with one or more of the first through seventh aspects, process 700 includes receiving an indication that communication between the base station and the UE is to be via the relay UE based at least in part on at least one of: the UE being a low-tier UE and the relay UE being a high-tier UE; the UE being associated with a lower capability than the relay UE; an access link of the UE having a lesser quality than an access link of the relay UE; or the UE being located further from the base station than the relay UE. In a ninth aspect, alone or in combination with one or more of the first through eighth aspects, the indication is received via radio resource control signaling, a medium access control control element, or downlink control information.

In a tenth aspect, alone or in combination with one or more of the first through ninth aspects, process 700 includes transmitting a capability report that indicates whether the UE supports using the relay UE for one or more of: relaying an initial transmission; relaying HARQ feedback; relaying a retransmission; relaying a data channel communication; or relaying a control channel communication.

In an eleventh aspect, alone or in combination with one or more of the first through tenth aspects, process 700 includes receiving a capability report that indicates whether the relay UE supports one or more of: relaying an initial transmission; relaying HARQ feedback; relaying a retransmission; relaying a data channel communication; or relaying a control channel communication.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
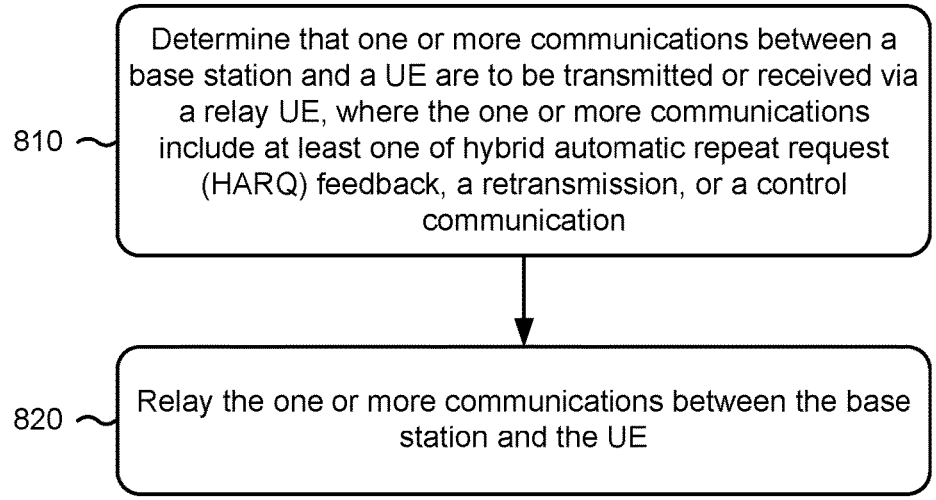
FIG. 8 is a diagram illustrating an example process performed, for example, by a relay UE, in accordance with various aspects of the present disclosure.

FIG. 8 is a diagram illustrating an example process 800 performed, for example, by a relay UE, in accordance with various aspects of the present disclosure. Example process 800 is an example where the relay UE (e.g., UE 120, UE 305, and/or the like) performs operations associated with communication via sidelink relay.

As shown in FIG. 8, in some aspects, process 800 may include determining that one or more communications between a base station and a UE are to be transmitted or received via a relay UE, wherein the one or more communications include at least one of HARQ feedback, a retransmission, or a control communication (block 810). For example, the relay UE (e.g., using controller/processor 280 and/or the like) may determine that one or more communications between a base station and a UE are to be transmitted or received via the relay UE, as described above. In some aspects, the one or more communications include at least one of HARQ feedback, a retransmission, or a control communication.

As further shown in FIG. 8, in some aspects, process 800 may include relaying the one or more communications between the base station and the UE (block 820). For example, the relay UE (e.g., using controller/processor 280, transmit processor 264, TX MIMO processor 266, MOD 254, antenna 252, DEMOD 254, MIMO detector 256, receive processor 258, and/or the like) may relay the one or more communications between the base station and the UE, as described above.

Process 800 may include additional aspects, such as any single aspect or any combination of aspects described below and/or in connection with one or more other processes described elsewhere herein.

In a first aspect, relaying the one or more communications may include receiving a downlink communication on an access link with the base station, and transmitting the downlink communication on a sidelink with the UE.

In a second aspect, alone or in combination with the first aspect, relaying the one or more communications may include receiving HARQ feedback, for a downlink communication, on a sidelink with the UE, and transmitting the HARQ feedback on an access link with the base station. In a third aspect, alone or in combination with one or more of the first and second aspects, relaying the one or more communications may include receiving a retransmission of the downlink communication on the access link with the base station, and transmitting the retransmission on the sidelink with the UE. In a fourth aspect, alone or in combination with one or more of the first through third aspects, process 800 includes decoding and re-encoding the retransmission prior to transmitting the retransmission on the sidelink with the UE.

In a fifth aspect, alone or in combination with one or more of the first through fourth aspects, relaying the one or more communications may include receiving an uplink communication on a sidelink with the UE, and transmitting the uplink communication on an access link with the base station. In a sixth aspect, alone or in combination with one or more of the first through fifth aspects, relaying the one or more communications may include receiving a retransmission, for the uplink communication, on the sidelink with the UE, and transmitting the retransmission on the access link with the base station. In a seventh aspect, alone or in combination with one or more of the first through sixth aspects, process 800 includes decoding and re-encoding the retransmission prior to transmitting the retransmission on the access link with the base station. In an eighth aspect, alone or in combination with one or more of the first through seventh aspects, relaying the one or more communications may include receiving a downlink control channel communication, that schedules the retransmission, on the access link with the base station, and transmitting the downlink control channel communication on the sidelink with the UE.

In a ninth aspect, alone or in combination with one or more of the first through eighth aspects, relaying the one or more communications may include receiving a downlink control channel communication on an access link with the base station, and transmitting the downlink control channel communication on a sidelink with the UE. In a tenth aspect, alone or in combination with one or more of the first through ninth aspects, relaying the one or more communications may include receiving an uplink control channel communication on a sidelink with the UE, and transmitting the uplink control channel communication on an access link with the base station.

In an eleventh aspect, alone or in combination with one or more of the first through tenth aspects, process 800 includes receiving an indication that communication between the base station and the UE is to be via the relay UE based at least in part on at least one of: the UE being a low-tier UE and the relay UE being a high-tier UE; the UE being associated with a lower capability than the relay UE; an access link of the UE having a lesser quality than an access link of the relay UE; or the UE being located further from the base station than the relay UE. In a twelfth aspect, alone or in combination with one or more of the first through eleventh aspects, the indication is received via radio resource control signaling, a medium access control control element, or downlink control information.

In a thirteenth aspect, alone or in combination with one or more of the first through twelfth aspects, process 800 includes receiving a capability report that indicates whether the UE supports using the relay UE for one or more of: relaying an initial transmission; relaying HARQ feedback; relaying a retransmission; relaying a data channel communication; or relaying a control channel communication.

In a fourteenth aspect, alone or in combination with one or more of the first through thirteenth aspects, process 800 includes transmitting a capability report that indicates whether the relay UE supports one or more of: relaying an initial transmission; relaying HARQ feedback; relaying a retransmission; relaying a data channel communication; or relaying a control channel communication.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

FIG. 9 is a diagram illustrating an example process 900 performed, for example, by a BS, in accordance with various aspects of the present disclosure. Example process 900 is an example where the BS (e.g., BS 110 and/or the like) performs operations associated with communication via sidelink relay.

As shown in FIG. 9, in some aspects, process 900 may include determining that one or more communications with a UE are to be transmitted or received via a relay UE, wherein the one or more communications include at least one of HARQ feedback, a retransmission, or a control communication (block 910). For example, the BS (e.g., using controller/processor 240 and/or the like) may determine that one or more communications with a UE are to be transmitted or received via a relay UE, as described above. In some aspects, the one or more communications include at least one of HARQ feedback, a retransmission, or a control communication.

As further shown in FIG. 9, in some aspects, process 900 may include transmitting or receiving the one or more communications via the relay UE (block 920). For example, the BS (e.g., using controller/processor 240, transmit processor 220, TX MIMO processor 230, MOD 232, antenna 234, DEMOD 232, MIMO detector 236, receive processor 238, and/or the like) may transmit or receive the one or more communications via the relay UE, as described above.

Process 900 may include additional aspects, such as any single aspect or any combination of aspects described below and/or in connection with one or more other processes described elsewhere herein.

In a first aspect, transmitting or receiving the one or more communications may include transmitting a downlink communication on an access link with the UE or on an access link with the relay UE, and receiving HARQ feedback, for the downlink communication, on the access link with the relay UE. In a second aspect, alone or in combination with the first aspect, transmitting or receiving the one or more communications may include transmitting a retransmission of the downlink communication on the access link with the UE or on the access link with the relay UE.

In a third aspect, alone or in combination with one or more of the first and second aspects, transmitting or receiving the one or more communications may include receiving an uplink communication on an access link with the UE or on an access link with the relay UE, and receiving a retransmission of the uplink communication on the access link with the relay UE. In a fourth aspect, alone or in combination with one or more of the first through third aspects, the retransmission has been decoded and re-encoded by the relay UE. In a fifth aspect, alone or in combination with one or more of the first through fourth aspects, transmitting or receiving the one or more communications may include transmitting a downlink control channel communication, that schedules the retransmission, on the access link with the UE or on the access link with the relay UE.

In a sixth aspect, alone or in combination with one or more of the first through fifth aspects, transmitting or receiving the one or more communications may include transmitting a downlink control channel communication on an access link with the relay UE, and transmitting a downlink shared channel communication on an access link with the UE. In a seventh aspect, alone or in combination with one or more of the first through sixth aspects, transmitting or receiving the one or more communications may include receiving an uplink control channel communication on an access link with the relay UE, and receiving an uplink shared channel communication on an access link with the UE.

In an eighth aspect, alone or in combination with one or more of the first through seventh aspects, process 900 includes transmitting an indication that communication between the base station and the UE is to be via the relay UE based at least in part on at least one of: the UE being a low-tier UE and the relay UE being a high-tier UE; the UE being associated with a lower capability than the relay UE; an access link of the UE having a lesser quality than an access link of the relay UE; or the UE being located further from the base station than the relay UE. In a ninth aspect, alone or in combination with one or more of the first through eighth aspects, the indication is transmitted via radio resource control signaling, a medium access control control element, or downlink control information.

In a tenth aspect, alone or in combination with one or more of the first through ninth aspects, process 900 includes receiving a capability report that indicates whether the UE supports using the relay UE for one or more of: relaying an initial transmission; relaying HARQ feedback; relaying a retransmission; relaying a data channel communication; or relaying a control channel communication.

In an eleventh aspect, alone or in combination with one or more of the first through tenth aspects, process 900 includes receiving a capability report that indicates whether the relay UE supports one or more of: relaying an initial transmission; relaying HARQ feedback; relaying a retransmission; relaying a data channel communication; or relaying a control channel communication.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
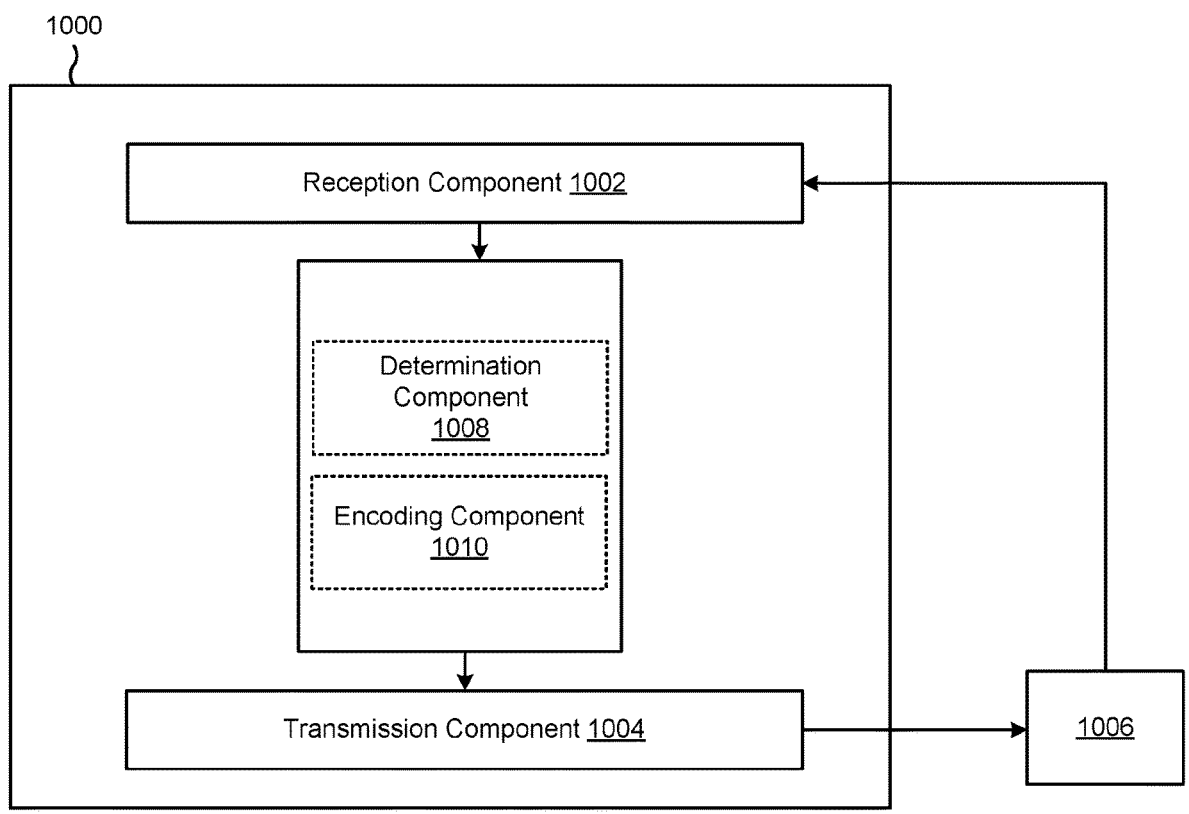
FIGS. 10-11 are diagrams illustrating example apparatuses for wireless communication, in accordance with various aspects of the present disclosure.

FIG. 10 is a diagram of an example apparatus 1000 for wireless communication, in accordance with various aspects of the present disclosure. The apparatus 1000 may be a UE (e.g., a relay UE), or a UE may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include one or more of a determination component 1008 or an encoding component 1010, among other examples.

In some aspects, the apparatus 1000 may be configured to perform one or more operations described herein in connection with FIGS. 4-6. Additionally or alternatively, the apparatus 1000 may be configured to perform one or more processes described herein, such as process 700 of FIG. 7, process 800 of FIG. 8, or a combination thereof. In some aspects, the apparatus 1000 and/or one or more components shown in FIG. 10 may include one or more components of the UE described above in connection with FIG. 2. Additionally, or alternatively, one or more components shown in FIG. 10 may be implemented within one or more components described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1006. In some aspects, the reception component 1002 may include one or more antennas, a demodulator, a MIMO detector, a receive processor, a controller/processor, a memory, or a combination thereof, of the UE described above in connection with FIG. 2.

The transmission component 1004 may transmit communications, such as reference signals, control information, data communications, or a combination thereof, to the apparatus 1006. In some aspects, one or more other components of the apparatus 1006 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modulator, a transmit MIMO processor, a transmit processor, a controller/processor, a memory, or a combination thereof, of the UE described above in connection with FIG. 2. In some aspects, the transmission component 1004 may be collocated with the reception component 1002 in a transceiver.

The determination component 1008 may determine that one or more communications with a base station are to be transmitted or received via a relay UE. In some aspects, the one or more communications include at least one of HARQ feedback, a retransmission, or a control communication. In some aspects, the determination component 1008 may include a controller/processor, a memory, or a combination thereof, of the UE described above in connection with FIG. 2. The transmission component 1004 may transmit the one or more communications via the relay UE. The reception component 1002 may receive the one or more communications via the relay UE.

The reception component 1002 may receive an indication that communication between the base station and the UE is to be via the relay UE based at least in part on at least one of the UE being a low-tier UE and the relay UE being a high-tier UE; the UE being associated with a lower capability than the relay UE; an access link of the UE having a lesser quality than an access link of the relay UE; or the UE being located further from the base station than the relay UE.

The transmission component 1004 may transmit a capability report that indicates whether the UE supports using the relay UE for one or more of relaying an initial transmission; relaying HARQ feedback; relaying a retransmission; relaying a data channel communication; or relaying a control channel communication.

The reception component 1002 may receive a capability report that indicates whether the relay UE supports one or more of relaying an initial transmission; relaying HARQ feedback; relaying a retransmission; relaying a data channel communication; or relaying a control channel communication.

The determination component 1008 may determine that one or more communications between a base station and a UE are to be transmitted or received via the relay UE. In some aspects, the one or more communications include at least one of HARQ feedback, a retransmission, or a control communication. The transmission component 1004 may relay the one or more communications between the base station and the UE.

The encoding component 1010 may decode and re-encode the retransmission prior to transmitting the retransmission on the sidelink with the UE. In some aspects, the encoding component 1010 may include a demodulator, a MIMO detector, a receive processor, a modulator, a transmit MIMO processor, a transmit processor, a controller/processor, a memory, or a combination thereof, of the UE described above in connection with FIG. 2. The encoding component 1010 may decode and re-encode the retransmission prior to transmitting the retransmission on the access link with the base station.

The reception component 1002 may receive an indication that communication between the base station and the UE is to be via the relay UE based at least in part on at least one of the UE being a low-tier UE and the relay UE being a high-tier UE; the UE being associated with a lower capability than the relay UE; an access link of the UE having a lesser quality than an access link of the relay UE; or the UE being located further from the base station than the relay UE.

The reception component 1002 may receive a capability report that indicates whether the UE supports using the relay UE for one or more of relaying an initial transmission; relaying HARQ feedback; relaying a retransmission; relaying a data channel communication; or relaying a control channel communication.

The transmission component 1004 may transmit a capability report that indicates whether the relay UE supports one or more of relaying an initial transmission; relaying HARQ feedback; relaying a retransmission; relaying a data channel communication; or relaying a control channel communication.

The quantity and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally or alternatively, a set of (one or more) components shown in FIG. 10 may perform one or more functions described as being performed by another set of components shown in FIG. 10.

Figure 11:
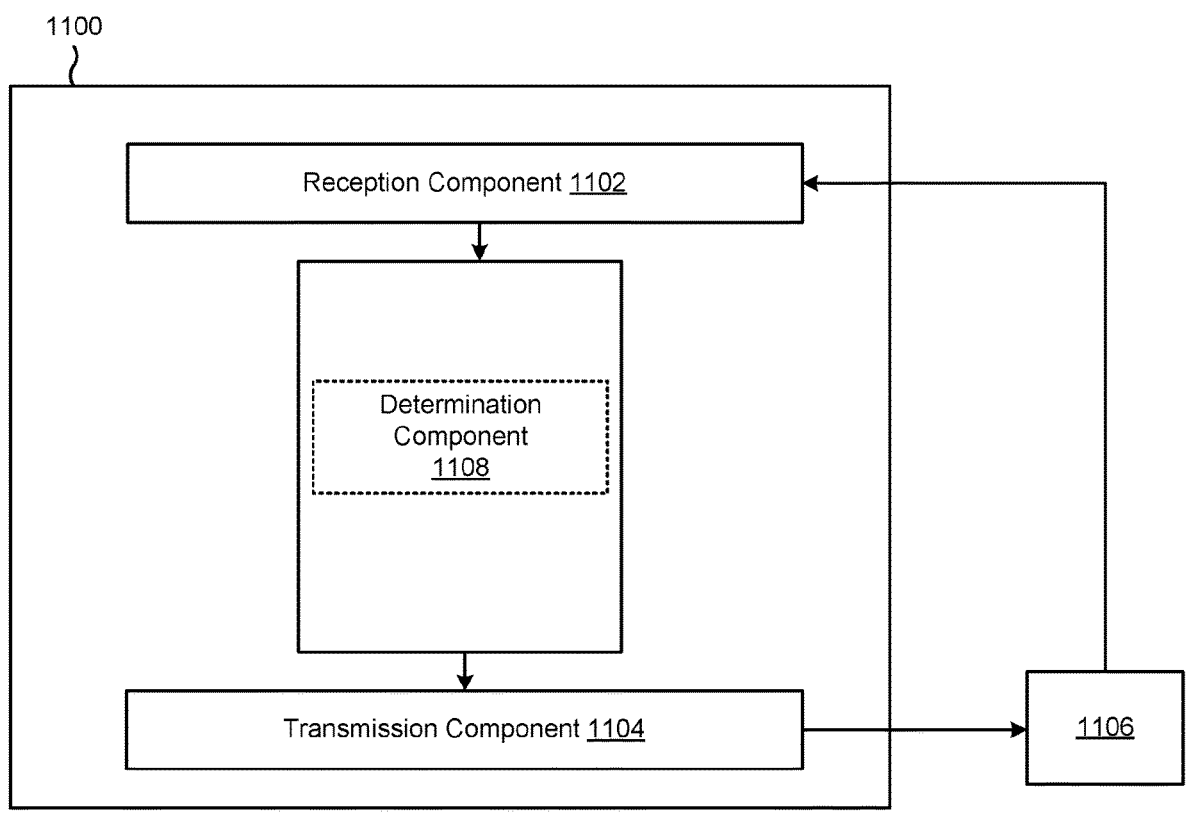

FIG. 11 is a diagram of an example apparatus 1100 for wireless communication, in accordance with various aspects of the present disclosure. The apparatus 1100 may be a base station, or a base station may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104. As further shown, the apparatus 1100 may include a determination component 1108, among other examples.

In some aspects, the apparatus 1100 may be configured to perform one or more operations described herein in connection with FIGS. 4-6. Additionally or alternatively, the apparatus 1100 may be configured to perform one or more processes described herein, such as process 900 of FIG. 9, or a combination thereof. In some aspects, the apparatus 1100 and/or one or more components shown in FIG. 11 may include one or more components of the base station described above in connection with FIG. 2. Additionally, or alternatively, one or more components shown in FIG. 11 may be implemented within one or more components described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1106. In some aspects, the reception component 1102 may include one or more antennas, a demodulator, a MIMO detector, a receive processor, a controller/processor, a memory, or a combination thereof, of the base station described above in connection with FIG. 2.

The transmission component 1104 may transmit communications, such as reference signals, control information, data communications, or a combination thereof, to the apparatus 1106. In some aspects, one or more other components of the apparatus 1106 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modulator, a transmit MIMO processor, a transmit processor, a controller/processor, a memory, or a combination thereof, of the base station described above in connection with FIG. 2. In some aspects, the transmission component 1104 may be collocated with the reception component 1102 in a transceiver.

The determination component 1108 may determine that one or more communications with a UE are to be transmitted or received via a relay UE. In some aspects, the one or more communications include at least one of HARQ feedback, a retransmission, or a control communication. In some aspects, the determination component 1108 may include a controller/processor, a memory, or a combination thereof, of the base station described above in connection with FIG. 2. The transmission component 1104 may transmit the one or more communications via the relay UE. The reception component 1102 may receive the one or more communications via the relay UE.

The transmission component 1104 may transmit an indication that communication between the base station and the UE is to be via the relay UE based at least in part on at least one of the UE being a low-tier UE and the relay UE being a high-tier UE; the UE being associated with a lower capability than the relay UE; an access link of the UE having a lesser quality than an access link of the relay UE; or the UE being located further from the base station than the relay UE.

The reception component 1102 may receive a capability report that indicates whether the UE supports using the relay UE for one or more of relaying an initial transmission; relaying HARQ feedback; relaying a retransmission; relaying a data channel communication; or relaying a control channel communication.

The reception component 1102 may receive a capability report that indicates whether the relay UE supports one or more of relaying an initial transmission; relaying HARQ feedback; relaying a retransmission; relaying a data channel communication; or relaying a control channel communication.

The quantity and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally or alternatively, a set of (one or more) components shown in FIG. 11 may perform one or more functions described as being performed by another set of components shown in FIG. 11.

The following provides an overview of aspects of the present disclosure:

Aspect 1: A method of wireless communication performed by a UE, comprising: determining that one or more communications with a base station are to be transmitted or received via a relay UE, wherein the one or more communications include at least one of HARQ feedback, a retransmission, or a control communication; and transmitting or receiving the one or more communications via the relay UE.

Aspect 2: The method of aspect 1, wherein transmitting or receiving the one or more communications comprises: receiving a downlink communication on a sidelink with the relay UE; and transmitting HARQ feedback, for the downlink communication, on the sidelink with the relay UE.

Aspect 3: The method of any of aspects 1 through 2, wherein transmitting or receiving the one or more communications further comprises: receiving a retransmission of the downlink communication on the sidelink with the relay UE.

Aspect 4: The method of any of aspects 1 through 3, wherein the retransmission is received on the sidelink with the relay UE, and wherein the retransmission has been decoded and re-encoded by the relay UE.

Aspect 5: The method of any of aspects 1 through 4, wherein transmitting or receiving the one or more communications comprises: transmitting an uplink communication on a sidelink with the relay UE; and transmitting a retransmission of the uplink communication on the sidelink with the relay UE.

Aspect 6: The method of any of aspects 1 through 5, wherein transmitting or receiving the one or more communications further comprises: receiving a downlink control channel communication, that schedules the retransmission, on the sidelink with the relay UE.

Aspect 7: The method of any of aspects 1 through 6, wherein transmitting or receiving the one or more communications comprises: receiving a downlink control channel communication on a sidelink with the relay UE; and receiving a downlink shared channel communication on an access link with the base station.

Aspect 8: The method of any of aspects 1 through 7, wherein transmitting or receiving the one or more communications comprises: transmitting an uplink control channel communication on a sidelink with the relay UE; and transmitting an uplink shared channel communication on an access link with the base station.

Aspect 9: The method of any of aspects 1 through 8, further comprising receiving an indication that communication between the base station and the UE is to be via the relay UE based at least in part on at least one of: the UE being a low-tier UE and the relay UE being a high-tier UE; the UE being associated with a lower capability than the relay UE; an access link of the UE having a lesser quality than an access link of the relay UE; or the UE being located further from the base station than the relay UE.

Aspect 10: The method of aspect 9, wherein the indication is received via RRC signaling, a MAC-CE, or DCI.

Aspect 11: The method of any of aspects 1 through 10, further comprising transmitting a capability report that indicates whether the UE supports using the relay UE for one or more of: relaying an initial transmission; relaying HARQ feedback; relaying a retransmission; relaying a data channel communication; or relaying a control channel communication.

Aspect 12: The method of any of aspects 1 through 11, further comprising receiving a capability report that indicates whether the relay UE supports one or more of: relaying an initial transmission; relaying HARQ feedback; relaying a retransmission; relaying a data channel communication; or relaying a control channel communication.

Aspect 13: A method of wireless communication performed by a relay UE, comprising: determining that one or more communications between a base station and a UE are to be transmitted or received via the relay UE, wherein the one or more communications include at least one of HARQ feedback, a retransmission, or a control communication; and relaying the one or more communications between the base station and the UE.

Aspect 14: The method of aspect 13, wherein relaying the one or more communications comprises: receiving a downlink communication on an access link with the base station; and transmitting the downlink communication on a sidelink with the UE.

Aspect 15: The method of any of aspects 13 through 14, wherein relaying the one or more communications comprises: receiving HARQ feedback, for a downlink communication, on a sidelink with the UE; and transmitting the HARQ feedback on an access link with the base station.

Aspect 16: The method of any of aspects 13 through 15, wherein relaying the one or more communications further comprises: receiving a retransmission of the downlink communication on the access link with the base station; and transmitting the retransmission on the sidelink with the UE.

Aspect 17: The method of any of aspects 13 through 16, further comprising decoding and re-encoding the retransmission prior to transmitting the retransmission on the sidelink with the UE.

Aspect 18: The method of any of aspects 13 through 17, wherein relaying the one or more communications comprises: receiving an uplink communication on a sidelink with the UE; and transmitting the uplink communication on an access link with the base station.

Aspect 19: The method of any of aspects 13 through 18, wherein relaying the one or more communications further comprises: receiving a retransmission, for the uplink communication, on the sidelink with the UE; and transmitting the retransmission on the access link with the base station.

Aspect 20: The method of any of aspects 13 through 19, further comprising: decoding and re-encoding the retransmission prior to transmitting the retransmission on the access link with the base station.

Aspect 21: The method of any of aspects 13 through 20, wherein relaying the one or more communications further comprises: receiving a downlink control channel communication, that schedules the retransmission, on the access link with the base station; and transmitting the downlink control channel communication on the sidelink with the UE.

Aspect 22: The method of any of aspects 13 through 21, wherein relaying the one or more communications comprises: receiving a downlink control channel communication on an access link with the base station; and transmitting the downlink control channel communication on a sidelink with the UE.

Aspect 23: The method of any of aspects 13 through 22, wherein relaying the one or more communications comprises: receiving an uplink control channel communication on a sidelink with the UE; and transmitting the uplink control channel communication on an access link with the base station.

Aspect 24: The method of any of aspects 13 through 23, further comprising receiving an indication that communication between the base station and the UE is to be via the relay UE based at least in part on at least one of: the UE being a low-tier UE and the relay UE being a high-tier UE; the UE being associated with a lower capability than the relay UE; an access link of the UE having a lesser quality than an access link of the relay UE; or the UE being located further from the base station than the relay UE.

Aspect 25: The method of aspect 24, wherein the indication is received via RRC signaling, a MAC-CE, or DCI.

Aspect 26: The method of any of aspects 13 through 25, further comprising receiving a capability report that indicates whether the UE supports using the relay UE for one or more of: relaying an initial transmission; relaying HARQ feedback; relaying a retransmission; relaying a data channel communication; or relaying a control channel communication.

Aspect 27: The method of any of aspects 13 through 26, further comprising: transmitting a capability report that indicates whether the relay UE supports one or more of: relaying an initial transmission; relaying HARQ feedback; relaying a retransmission; relaying a data channel communication; or relaying a control channel communication.

Aspect 28: A method of wireless communication performed by a base station, comprising: determining that one or more communications with a UE are to be transmitted or received via a relay UE, wherein the one or more communications include at least one of HARQ feedback, a retransmission, or a control communication; and transmitting or receiving the one or more communications via the relay UE.

Aspect 29: The method of aspect 28, wherein transmitting or receiving the one or more communications comprises: transmitting a downlink communication on an access link with the relay UE; and receiving HARQ feedback, for the downlink communication, on the access link with the relay UE.

Aspect 30: The method of any of aspects 28 through 29, wherein transmitting or receiving the one or more communications further comprises: transmitting a retransmission of the downlink communication on the access link with the relay UE.

Aspect 31: The method of any of aspects 28 through 30, wherein transmitting or receiving the one or more communications comprises: receiving an uplink communication on an access link with the relay UE; and receiving a retransmission of the uplink communication on the access link with the relay UE.

Aspect 32: The method of any of aspects 28 through 31, wherein the retransmission has been decoded and re-encoded by the relay UE.

Aspect 33: The method of any of aspects 28 through 32, wherein transmitting or receiving the one or more communications further comprises: transmitting a downlink control channel communication, that schedules the retransmission, on the access link with the relay UE.

Aspect 34: The method of any of aspects 28 through 33, wherein transmitting or receiving the one or more communications comprises: transmitting a downlink control channel communication on an access link with the relay UE; and transmitting a downlink shared channel communication on an access link with the UE.

Aspect 35: The method of any of aspects 28 through 34, wherein transmitting or receiving the one or more communications comprises: receiving an uplink control channel communication on an access link with the relay UE; and receiving an uplink shared channel communication on an access link with the UE.

Aspect 36: The method of any of aspects 28 through 35, further comprising transmitting an indication that communication between the base station and the UE is to be via the relay UE based at least in part on at least one of: the UE being a low-tier UE and the relay UE being a high-tier UE; the UE being associated with a lower capability than the relay UE; an access link of the UE having a lesser quality than an access link of the relay UE; or the UE being located further from the base station than the relay UE.

Aspect 37: The method of aspect 36, wherein the indication is transmitted via RRC signaling, a MAC-CE, or DCI.

Aspect 38: The method of any of aspects 28 through 37, further comprising: receiving a capability report that indicates whether the UE supports using the relay UE for one or more of: relaying an initial transmission; relaying HARQ feedback; relaying a retransmission; relaying a data channel communication; or relaying a control channel communication.

Aspect 39: The method of any of aspects 28 through 38, further comprising: receiving a capability report that indicates whether the relay UE supports one or more of: relaying an initial transmission; relaying HARQ feedback; relaying a retransmission; relaying a data channel communication; or relaying a control channel communication.

Aspect 40: An apparatus for wireless communication at a device, comprising a processor; memory coupled with the processor; and instructions stored in the memory and executable by the processor to cause the apparatus to perform the method of one or more aspects of aspects 1-39.

Aspect 41: A device for wireless communication, comprising a memory and one or more processors coupled to the memory, the memory and the one or more processors configured to perform the method of one or more aspects of aspects 1-39.

Aspect 42: An apparatus for wireless communication, comprising at least one means for performing the method of one or more aspects of aspects 1-39.

Aspect 43: A non-transitory computer-readable medium storing code for wireless communication, the code comprising instructions executable by a processor to perform the method of one or more aspects of aspects 1-39.

Aspect 44: A non-transitory computer-readable medium storing a set of instructions for wireless communication, the set of instructions comprising one or more instructions that, when executed by one or more processors of a device, cause the device to perform the method of one or more aspects of aspects 1-39.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
   transmitting a capability report that indicates whether the UE supports using a relay UE for one or more of relaying an initial transmission, relaying hybrid automatic repeat request (HARQ) feedback, relaying retransmissions, relaying data channel communications, or relaying control channel communications;
   receiving an indication that the relay UE is to be used as a relay, wherein the indication is based at least in part on the capability report; and
   transmitting or receiving one or more communications via the relay UE, wherein the one or more communications include at least one of HARQ feedback, a retransmission, or a control communication.

2. The method of claim 1, wherein transmitting or receiving the one or more communications comprises:
   receiving a downlink communication on a sidelink with the relay UE; and
   transmitting the HARQ feedback, for the downlink communication, on the sidelink with the relay UE.

3. The method of claim 2, wherein transmitting or receiving the one or more communications further comprises:
   receiving a retransmission of the downlink communication on the sidelink with the relay UE.

4. The method of claim 1, wherein transmitting or receiving the one or more communications comprises:
   transmitting an uplink communication on a sidelink with the relay UE; and
   transmitting a retransmission of the uplink communication on the sidelink with the relay UE.

5. The method of claim 4, wherein transmitting or receiving the one or more communications further comprises:
   receiving the control communication, that schedules the retransmission, on the sidelink with the relay UE.

6. The method of claim 1, wherein transmitting or receiving the one or more communications comprises:
   receiving the control communication on a sidelink with the relay UE.

7. The method of claim 1, wherein transmitting or receiving the one or more communications comprises:
   transmitting the control communication on a sidelink with the relay UE.

8. The method of claim 1,
   wherein the indication further indicates that communication between a network entity and the UE is to be via the relay UE based at least in part on at least one of:
      the UE being a low-tier UE and the relay UE being a high-tier UE;
      the UE being associated with a lower capability than the relay UE;
      an access link of the UE having a lesser quality than an access link of the relay UE; or
      the UE being located further from the network entity than the relay UE.

9. The method of claim 1, wherein the indication is based at least in part on at least one of:
   a bandwidth capability of the UE;
   a processing capability of the UE;
   a quality of an access link of the UE; or
   a location of the UE.

10. A method of wireless communication performed by a relay user equipment (UE), comprising:
    transmitting a capability report that indicates whether the relay UE supports one or more of relaying initial transmissions, relaying hybrid automatic repeat request (HARQ) feedback, relaying retransmissions, relaying data channel communications, or relaying control channel communications;
    receiving an indication that the relay UE is to be used as a relay, wherein the indication is based at least in part on the capability report; and
    relaying one or more communications between a network entity and a UE, wherein the one or more communications include at least one of HARQ feedback, a retransmission, or a control communication.

11. The method of claim 10, wherein relaying the one or more communications comprises:
    receiving the HARQ feedback, for a downlink communication, on a sidelink with the UE; and
    transmitting the HARQ feedback on an access link with the network entity.

12. The method of claim 11, wherein relaying the one or more communications further comprises:
    receiving a retransmission of the downlink communication on the access link with the network entity; and
    transmitting, on the sidelink with the UE, the retransmission of the downlink communication.

13. The method of claim 10, wherein relaying the one or more communications comprises:
    receiving a retransmission, for an uplink communication, on a sidelink with the UE; and
    transmitting the retransmission, for the uplink communication, on an access link with the network entity.

14. The method of claim 13, wherein relaying the one or more communications further comprises:

receiving the control communication, that schedules the retransmission, on the access link with the network entity; and
transmitting the control communication on the sidelink with the UE.

15. The method of claim 10, wherein relaying the one or more communications comprises:
receiving the control communication on an access link with the network entity; and
transmitting the control communication on a sidelink with the UE.

16. The method of claim 10, wherein relaying the one or more communications comprises:
receiving the control communication on a sidelink with the UE; and
transmitting the control communication on an access link with the network entity.

17. The method of claim 10,
wherein the indication further indicates that that communication between the network entity and the UE is to be via the relay UE based at least in part on at least one of:
the UE being a low-tier UE and the relay UE being a high-tier UE;
the UE being associated with a lower capability than the relay UE;
an access link of the UE having a lesser quality than an access link of the relay UE; or
the UE being located further from the network entity than the relay UE.

18. A method of wireless communication performed by a network entity, comprising:
receiving a capability report that indicates whether a user equipment (UE) supports using a relay UE for one or more of relaying initial transmissions, relaying hybrid automatic repeat request (HARQ) feedback, relaying retransmissions, relaying data channel communications, or relaying control channel communications;
transmitting an indication that the relay UE is to be used as a relay, wherein the indication is based at least in part on the capability report; and
transmitting or receiving one or more communications via the relay UE, wherein the one or more communications include at least one of HARQ feedback, a retransmission, or a control communication.

19. The method of claim 18, wherein transmitting or receiving the one or more communications comprises:
transmitting a downlink communication on an access link with the relay UE; and
receiving the HARQ feedback, for the downlink communication, on the access link with the relay UE.

20. The method of claim 19, wherein transmitting or receiving the one or more communications further comprises:
transmitting a retransmission of the downlink communication on the access link with the relay UE.

21. The method of claim 18, wherein transmitting or receiving the one or more communications comprises:
receiving an uplink communication on an access link with the relay UE; and
receiving a retransmission of the uplink communication on the access link with the relay UE.

22. The method of claim 21, wherein transmitting or receiving the one or more communications further comprises:
transmitting the control communication, that schedules the retransmission, on the access link with the relay UE.

23. The method of claim 18, wherein transmitting or receiving the one or more communications comprises:
transmitting the control communication on an access link with the relay UE.

24. The method of claim 18, wherein transmitting or receiving the one or more communications comprises:
receiving the control communication on an access link with the relay UE.

25. The method of claim 18,
wherein the indication further indicates that communication between the network entity and the UE is to be via the relay UE based at least in part on at least one of:
the UE being a low-tier UE and the relay UE being a high-tier UE;
the UE being associated with a lower capability than the relay UE;
an access link of the UE having a lesser quality than an access link of the relay UE; or
the UE being located further from the network entity than the relay UE.

26. The method of claim 18, further comprising:
receiving a capability report that indicates whether the relay UE supports one or more of:
relaying the initial transmissions;
relaying the HARQ feedback;
relaying the retransmissions;
relaying the data channel communications; or
relaying the control channel communications.

27. A user equipment (UE) for wireless communication, comprising:
a memory; and
one or more processors, coupled to the memory, configured to:
transmit a capability report that indicates whether the UE supports using a relay UE for one or more of relaying an initial transmission, relaying hybrid automatic repeat request (HARQ) feedback, relaying retransmissions, relaying data channel communications, or relaying control channel communications;
receive an indication that the relay UE is to be used as a relay, wherein the indication is based at least in part on the capability report; and
transmit or receive one or more communications via the relay UE, wherein the one or more communications include at least one of HARQ feedback, a retransmission, or a control communication.

28. The UE of claim 27, wherein the one or more processors, to transmit or receive the one or more communications, are configured to:
receive a downlink communication on a sidelink with the relay UE; and
transmit the HARQ feedback, for the downlink communication, on the sidelink with the relay UE.

29. The UE of claim 28, wherein the one or more processors, to transmit or receive the one or more communications, are further configured to:
receive a retransmission of the downlink communication on the sidelink with the relay UE.

30. The UE of claim 27, wherein the one or more processors, to transmit or receive the one or more communications, are configured to:
transmit an uplink communication on a sidelink with the relay UE; and
transmit a retransmission of the uplink communication on the sidelink with the relay UE.

31. The UE of claim 30, wherein the one or more processors, to transmit or receive the one or more communications, are further configured to:
  receive the control communication, that schedules the retransmission, on the sidelink with the relay UE.

32. A relay user equipment (UE) for wireless communication, comprising:
  a memory; and
  one or more processors, coupled to the memory, configured to:
    transmit a capability report that indicates whether the relay UE supports one or more of relaying initial transmissions, relaying hybrid automatic repeat request (HARQ) feedback, relaying retransmissions, relaying data channel communications, or relaying control channel communications;
    receive an indication that the relay UE is to be used as a relay, wherein the indication is based at least in part on the capability report; and
    relay one or more communications between a network entity and a UE, wherein the one or more communications include at least one of HARQ feedback, a retransmission, or a control communication.

33. The relay UE of claim 32, wherein the one or more processors, to relay the one or more communications, are configured to:
  receive the HARQ feedback, for a downlink communication, on a sidelink with the UE; and
  transmit the HARQ feedback on an access link with the network entity.

34. The relay UE of claim 33, wherein the one or more processors, to relay the one or more communications, are further configured to:
  receive a retransmission of the downlink communication on the access link with the network entity; and
  transmit, on the sidelink with the UE, the retransmission of the downlink communication.

35. The relay UE of claim 32, wherein the one or more processors, to relay the one or more communications, are configured to:
  receive a retransmission, for an uplink communication, on a sidelink with the UE; and
  transmit the retransmission, for the uplink communication, on an access link with the network entity.

\* \* \* \* \*